Oct. 21, 1952     G. W. WILLITS     2,614,936
CHEESE BANDAGE
Filed May 20, 1948
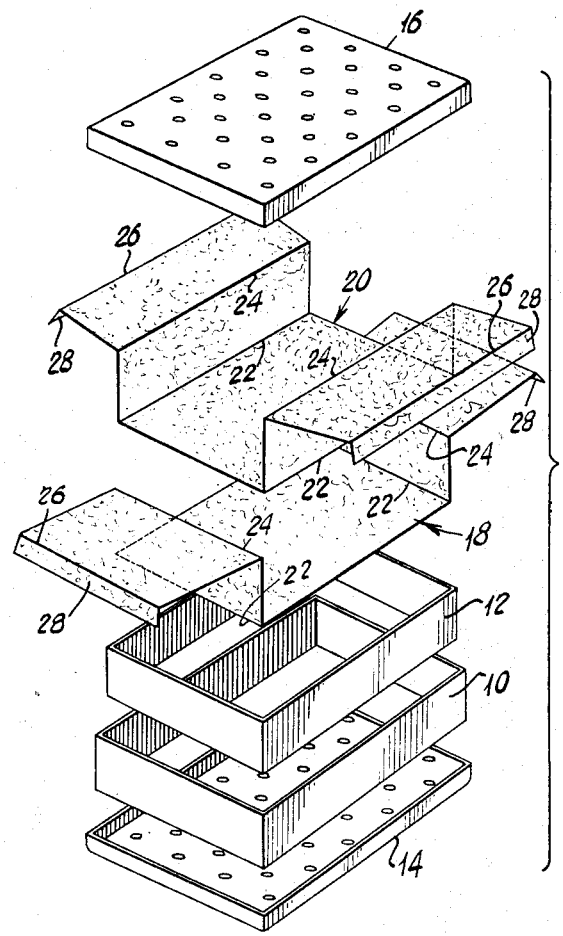
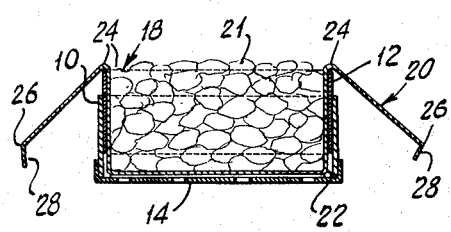
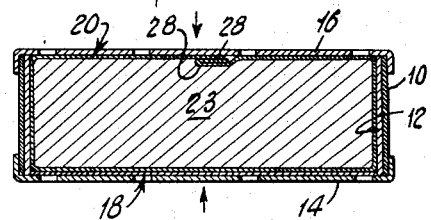
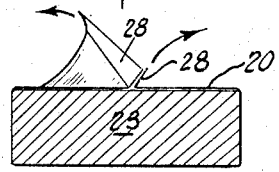
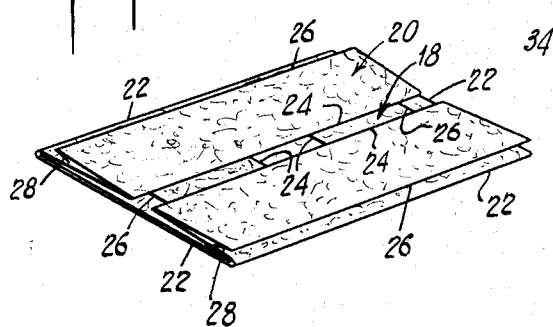
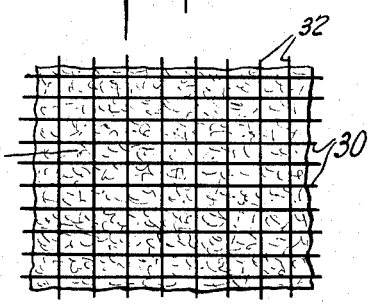
INVENTOR
GEORGE W. WILLITS.
BY
J. L. Chisholm
ATTORNEY Patented Oct. 21, 1952

2,614,936

UNITED STATES PATENT OFFICE 2,614,936

CHEESE BANDAGE

George W. Willits, Hinsdale, Ill., assignor to Johnson & Johnson, a corporation of New Jersey Application May 20, 1948, Serial No. 28,261

6 Claims. (Cl. 99—116)

This invention relates to cheese making and to cheese bandages.

In one method of cheese making it is customary to line a mold, called a hoop, with cheesecloth, fill the hoop with cut lumps of cheese curd from the curdling vat, and press the cheese in a press. Thereafter the cheese is removed from the hoop, the cloth or cheese bandage is stripped from the cheese, and the cheese is cut up for packaging. The pressing operation is for two purposes, to express the whey, and to form into one mass the individual lumps of cheese curd (called healing the cheese). The cloth prevents the cheese from sticking to the hoop and allows it to be removed easily in one piece.

There have been two disadvantages in such processes. In usual practice it has required from ten to twelve hours or more to heal the cheese. Also it has been difficult to strip the bandage cleanly from the cheese without leaving threads embedded in the cheese and without tearing out chunks of the cheese.

This invention is based on my discovery that certain smooth, pervious non-woven fabrics do not adhere to cheese as do woven fabrics and that they cause cheese to heal better and quicker than has been done with woven fabrics. Accordingly it is an object of my invention to provide an improved cheese bandage made of or including such non-woven fabric which will readily strip from the cheese and to improve and shorten the cheese making process. Another object is to provide as a convenient unitary package a cheese bandage assembled in a form which facilitates its application to cheese hoops.

These and other objects and advantages of the invention will be apparent from the accompanying specification in which one form of my invention is set forth as an example, and from the accompanying drawings, in which:

Fig. 1 is an exploded perspective of a cheese hoop and one form of my improved cheese bandage;

Fig. 2 is a transverse section of a cheese hoop assembled with my improved bandage, before compressing the cheese;

Fig. 3 is a section similar to Fig. 2 with the cheese compressed;

Fig. 4 is a diagrammatic showing corresponding to Fig. 3 showing the stripping flaps of the bandage;

Fig. 5 is a perspective of an assembled cheese bandage package; and

Fig. 6 is a magnified fragmentary plan of a fabric used in a modified form of the invention.

In carrying out my invention, I may use a conventional cheese hoop including an outer casing 10, an inner telescoping casing 12, a perforated bottom 14 and top 16. The bottom, and inner and outer telescoping casings are assembled, the inner casing being held by any suitable means in position projecting above the outer casing (Fig. 2). The box thus formed is lined with two crossed strips 18 and 20 of the fabric constituting my improved bandage and is filled with cut lumps 21 of cheese curd from the curdling vats (Fig. 2). The strips of the bandage are folded over the mass of cheese lumps, the top 16 is placed on the hoop and the hoop is placed in a cheese press where pressure is applied to express the whey from the cheese and seal the lumps into a single mass 23. At the end of the pressing operation the inner telescoping section 12 has been pushed completely into the outer section 10 and all of the voids between lumps have been filled (Fig. 3). The lumps have then become an integral mass and any whey has been expressed through the openings in the hoop. Instead of using two separate crossed strips of fabric, I may cut out of a single piece of fabric a cross having the form of the two assembled strips 18 and 20 and thus save the duplication of fabric in the bottom of the hoop.

Prior to my invention, it was customary to line the hoop and incase the cheese by crossing two strips of cheesecloth in the hoop, one strip being as wide as the hoop is long and the other being as wide as the hoop is wide. Great difficulty has been experienced in accurately placing such cloth bandages in hoops. It is customary in cheese plants, particularly in warm weather, to operate large fans. The breeze created by these fans blows the flimsy cheesecloth about and makes it very difficult to place and retain the strips in the hoops. They blow about, wrinkling and folding, with the result that parts of the hoop are exposed causing sticking, and folds and layers of cloth become embedded in the cheese.

In accordance with the invention, I make the cheese bandage of an adhesively united, non-woven textile fabric, formed in any suitable known manner of making smooth, porous non-woven fabric. By textile fabric I mean a fabric made of textile fibers, that is, fibers suitable, as to length and character, for spinning and weaving by the usual textile processes and machines. This can be made by carding the usual textile fibers such as cotton or rayon, or both, and bonding with any suitable adhesive the fibers of as many superposed webs as may be required to get the desired strength and density. For example, four webs of carded cotton or rayon fibers from four carding machines may be superposed, the assembly dipped in a 2% dispersion of polyvinyl alcohol, run through a pair of squeeze rolls and dried. The polyvinyl alcohol adhesively bonds the fibers together to form a strong, smooth fabric which may weigh, for example, from 600 to 1000 grains per square yard and which, due to the low concentration of the adhesive, is pervious to air and water. The particular form or substance used in the adhesive bonding is not a part of my invention, it being only necessary to provide a fabric of the required strength, smoothness, perviousness and stiffness in which the fibers are sufficiently bonded to adhere to one another to produce a unitary fabric which will not shed fibers on the cheese when the bandage is stripped. Thus the card webs may be bonded with any suitable known adhesive, preferably one which is insoluble in water or whey when the fabric is completed. As other examples, the fabric may be made by carding a mixture of cotton fibers and thermoplastic fibers such as cellulose acetate and running the web through hot calender rolls to render the cellulose acetate fibers adhesive and cause them to adhere to one another and to the cotton fibers, or a carded cotton web can be briefly immersed in a sulfuric acid solution, pressed between squeeze rolls, rinsed and dried.

Such bonded fabric should be of a critical stiffness which is attained by regulating the quantity of adhesive. The fabric should be sufficiently stiff to maintain its flat form without wrinkling or folding unless intentionally or forcibly creased or folded and yet the fabric should be readily creasable or foldable by the application of a small amount of force applied by hand. The stiffness of writing paper is an example of a suitable stiffness for my bandage.

In making the bandage I take two strips of this material, one of which 18 is as wide as the width of the hoop and the other 20 as wide as the length of the hoop. Each of these strips is creased and folded inwardly along two parallel lines 22 adjacent the center of the strip which are spaced corresponding to the edges of the hoop. Thus a folded strip will just fit inside of the hoop, lining the bottom and two sides. The strips are also creased along lines 24 so as to be foldable both outwardly as shown in Fig. 1 and inwardly across the top of the mass of cheese curds at the position occupied by the top of the sleeve 12 as shown in Fig. 3. The strips are of such a length and are so folded around the cheese that the ends lie approximately at the center of the hoop as shown in Fig. 3. The strips adjacent the ends are creased and folded outwardly along lines 26 to provide a pair of flaps 28 by which the bandage may be grasped to strip it from the finished cheese.

One of the features of my invention is the assembly of a complete cheese bandage in a convenient package or unit. This is shown in Fig. 5. The strips are creased at the lines 22, 24 and 26 to adapt them to be folded but are inwardly folded only along the lines 22, being outwardly folded along the lines 24 so that each strip provides a three-part flat fold, as shown in Fig. 2. Due to the inherent critical stiffness of the fabric, the bandage lies flat and accurately in the bottom of the hoop and completely and accurately covers the sides. The flaps beyond the fold lines 24 retain their form and position and the whole bandage can be quickly and accurately placed in position, which position is retained despite drafts and other disturbances. The hoop is then filled with cheese and the ends of the strips are folded inwardly over the cheese along the creased lines 24. One end of each strip can lie under the removal flap 28 at the other end when the bandage is assembled so that after the cheese is healed, the innermost strip has a flap 28 which is not in contact with the cheese and consequently does not adhere to it. This permits the end of the strip to be grasped and the strip to be readily removed from the cheese.

Previous to my invention it was the custom in cheese plants to use woven cheesecloth bandages and to press the cheese overnight usually from 10 to 12 hours. It has been found surprisingly that with my improved bandage a cheese can be satisfactorily healed in as little as one hour using the customary pressures or even lower pressures. Also it has been found surprisingly that while the woven fabric of my invention is made up of individual fibers not twisted into yarns but merely adhesively secured together, this fabric strips from the cheese more cleanly than previously used woven fabrics. Woven fabrics shed threads, particularly at their edges, and these threads become embedded in the cheese. This requires removal of the threads by digging out, which is an expensive, wasteful and unsatisfactory practice.

In addition to stripping more cleanly from the cheese, my improved bandage has been found to provide a smoother and better healed cheese than has been obtainable with woven fabric. I believe that this is due to the complete enclosure of the cheese by the fine fibrous web which, except for permitting the passage of liquid through the pervious web, acts toward the cheese as if it had no interstices as distinguished from the large interstices between the threads of woven fabrics.

The non-woven fabric of which the bandage is made may be of any desired thickness or weight. In some instances it is desirable to use a very thin non-woven web. Such thin webs may with certain cheeses break before they strip from the cheese. Where this condition is encountered, I have found that all of the advantages of my invention can be obtained and the non-woven fabric rendered stronger by combining with the non-woven fabric a layer of coarse open-mesh gauze, for example having twenty warp threads 30 and twelve weft threads 32 per inch (Fig. 6). This may be done by laying down the card webs upon an apron of gauze and dipping the gauze and web together in the adhesive so that both gauze and web are adhesively united while the fibers of the web are secured together. Where this form of bandage is used, I prefer to place the gauze side next to the cheese. This causes weak webs to strip cleanly from the cheese and has been found to result in all the advantages of using only smooth, pervious non-woven fabric as explained above. The fibers 34 of the non-woven fabric fill up the interstices of the woven fabric and thus present to the cheese a fine-grained non-woven fabric over its entire surface.

I claim as my invention:

1. A cheese bandage for a rectangular cheese hoop comprising in combination an elongated strip of adhesively stiffened non-woven fabric formed by bonding textile fibers into a sheet, the width of the strip being approximately the length of the hoop and a second elongated strip of similar adhesively stiffened non-woven fabric whose width approximately equals the width of the hoop, each of said strips being folded inwardly along parallel lines corresponding to the bottom edges of the hoop to define a central zone in the strip, and being creased to adapt it to be folded along lines corresponding to the top edges of the hoop and being creased and folded outwardly to form a removing flap at the end of the strip, the strips being adapted to provide a complete enclosure for a rectangular cheese when crossed in the central areas.

2. A cheese bandage for a rectangular cheese hoop comprising in combination an elongated strip of non-woven fabric formed by bonding fibers into a sheet, the width being approximately the length of the hoop and a second elongated strip of similar non-woven fabric whose width approximately equals the width of the hoop, each of said strips being folded inwardly along parallel lines corresponding to the bottom edges of the hoop to define a central zone in the strip, and being creased to adapt it to be folded inwardly along lines corresponding to the top edges of the hoop and being creased and folded outwardly to form a removing flap at the end of the strip, the strips being adapted to provide a complete enclosure for a rectangular cheese when crossed in the central areas.

3. A cheese bandage package for providing a complete enclosure for a cheese in a rectangular hoop comprising in combination an elongated strip of adhesively bonded non-woven fabric formed by bonding textile fibers into a sheet, the width being approximately the length of the hoop and a second elongated strip of similar adhesively bonded non-woven fabric whose width approximately equals the width of the hoop, each of the strips being creased along parallel lines corresponding to the bottom of the hoop to define a central zone in the strip and being folded inwardly along the creases into a three-part flat fold, each of said strips being folded outwardly along parallel lines corresponding to the top edges of the hoop, said strips being crossed at their central zone and assembled with one strip surrounding the three-part flat fold of the other strip to provide a flat unitary bandage package.

4. A cheese bandage comprising a fabric for enclosing a cheese, said fabric including a smooth, pervious non-woven web of textile fibers adhesively secured together.

5. A cheese bandage comprising a fabric for enclosing a cheese, said fabric including a smooth, pervious non-woven web of textile fibers adhesively secured together, the fabric being sufficiently flexible to permit folding and creasing and sufficiently stiff to prevent wrinkling without intentional folding or creasing.

6. The method of making cheese which includes assembling lumps of cheese curd in a hoop, placing between the lumps and the hoop a smooth, pervious non-woven bandage of textile fibers adhesively secured together, pressing the cheese to expel whey throughout the bandage, maintaining the pressure until the cheese lumps have healed and stripping the bandage from the healed cheese.

G. W. WILLITS.

REFERENCES CITED

The following references are of record in the file of this patent:

UNITED STATES PATENTS

| Number | Name | Date |
| --- | --- | --- |
| 1,676,166 | Sokolsky | July 3, 1928 |
| 2,077,301 | Abrams et al. | Apr. 13, 1937 |
| 2,077,697 | Hunt | Apr. 20, 1937 |